United States Patent [19]

Bober et al.

[11] Patent Number: 4,603,998
[45] Date of Patent: Aug. 5, 1986

[54] SHAFT CONNECTION MECHANISM

[75] Inventors: Helmut Bober, Neunkirchen-S.; Theo Buthe, Lohmar; Karl Coenen, Hennef; Norbert Fartmann, Siegburg; Klaus Herbertz, Lohmar-Algert; Franz-Heinz Koch, Hennef-Happers.; Horst Kretschmer, Cologne; Clemens Nienhaus, Lohmar; Peter Schardt, Neunkirchen-S.; Jürgen Schibrowski, Lohmar; Willi Schmandt, Siegburg, all of Fed. Rep. of Germany

[73] Assignee: Jean Walterscheid GmbH, Lohmar, Fed. Rep. of Germany

[21] Appl. No.: 668,291

[22] Filed: Nov. 5, 1984

[30] Foreign Application Priority Data

Nov. 5, 1983 [DE] Fed. Rep. of Germany ....... 3340130

[51] Int. Cl.⁴ ................................................ F16B 7/00
[52] U.S. Cl. .................................... 403/322; 403/359; 403/325; 403/316
[58] Field of Search .............. 403/359, 322, 325, 321, 403/315, 316, 317; 464/182; 74/409, 440

[56] References Cited

U.S. PATENT DOCUMENTS

| 3,260,541 | 7/1966 | Sadler et al. | 403/359 X |
|---|---|---|---|
| 3,747,966 | 7/1973 | Wilkes et al. | 403/359 X |
| 3,822,951 | 7/1974 | Bornzin | 403/322 X |
| 3,827,816 | 8/1974 | Knapp et al. | 403/322 |
| 3,969,033 | 7/1976 | Recker | 403/322 |
| 3,992,120 | 11/1976 | Recker | 403/359 X |
| 4,185,938 | 1/1980 | Pareja | 403/359 |
| 4,283,158 | 8/1981 | Takahata | 403/359 X |
| 4,318,630 | 3/1982 | Herchenbach et al. | 403/322 |
| 4,523,871 | 6/1985 | Recker | 403/359 |

Primary Examiner—Cornelius J. Husar
Assistant Examiner—Todd G. Williams
Attorney, Agent, or Firm—Toren, McGeady, Stanger, Goldberg & Kiel

[57] ABSTRACT

A shaft connecting mechanism is provided between a slip-on hub and a power takeoff shaft by means of a control ring which extends around the slip-on hub and which is formed to have a pressure screw extend through a threaded bore therein, the pressure screw engaging against a clamping wedge in the slip-on hub which is formed with a trapezoidal configuration generally conforming with the configuration of an axiallly extending groove formed in the slip-on hub. Blocking members are arranged in radial apertures in the slip-on hub and pockets are formed in the control ring. The pressure screw when angularly aligned with the clamping wedge, places the control ring in the locked position and when the pressure screw and the clamping wedge are angularly unaligned, the blocking members enter the pockets in the control ring.

5 Claims, 6 Drawing Figures

SHAFT CONNECTION MECHANISM

The present invention relates generally to interconnecting devices for power shafts and more specifically to a shaft connecting mechanism for axially securing a slip-on hub on the power takeoff shaft of a tractor or other implement provided with, for example, a multi-wedge profile. Devices of the type to which the present invention relates normally include blocking members which are radially guided in radial apertures of the slip-on hub and which may be designed as spherical balls, for example, and with a control ring supported on the slip-on hub against the force of a peripheral spring so as to be rotatable to a limited extent, the control ring having pockets which partially receive the balls or blocking members when in the open position.

Shaft connecting devices of the type to which the present invention relates are known from the prior art in DE-OS No. 23 21 544. In the case of the shaft connection mechanism described therein, a hub is embraced by a tensioning ring provided with pockets for receiving the blocking members in an unlocked position. The tensioning ring is itself surrounded by a housing ring. Between the hub and the tensioning ring, provision is made for a spring acting in the peripheral direction and operating to load the tensioning ring with reference to the hub in the direction of the locked position.

In order to disengage the shaft connection, the housing ring must be turned in such a manner as to enable a push button guided therein to penetrate a radial bore provided in the tensioning ring in order to act upon a locking journal. By constantly pressing the push button, the housing ring, while carrying along the tensioning ring, must be turned until the locking journal encounters a hub bore receiving a blocking member. In this position, the pockets provided in the tensioning ring and permitting disengagement will be aligned with the blocking members which, in this position, will be able to escape into the pockets.

The disadvantages of a prior art design of the type described is that the disengaged position must be found by a tactile procedure. As a rule, this procedure is complicated in that when the shaft connection is used for agricultural applications, it is particularly likely to become very dirty and in such a case it becomes extremely difficult to find the correct position of the tensioning ring relative to the hub by tactile means.

Accordingly, the present invention is directed toward provision of a shaft connection mechanism for coupling a drive shaft, or a safety coupling connected thereto, with the power takeoff shaft of a tractor or implement. The invention is intended to provide a connecting mechanism which is easy to handle, which prevents rotational play and which, at the same time, ensures positive axial connection to the power takeoff shaft.

SUMMARY OF THE INVENTION

Briefly, the present invention may be described as a shaft connection mechanism particularly for securing a slip-on hub to the power takeoff shaft of a tractor comprising: radial apertures formed in said slip-on hub; blocking members guided radially in said radial apertures; a control ring supported on said slip-on hub, said control ring having pockets for receiving therein said blocking members; a peripheral spring interposed between said slip-on hub and said control ring, said control ring being supported on said slip-on hub against the force of said peripheral spring so as to be rotatable to a limited extent; an axially extending groove formed in said slip-on hub, said groove having a trapezoidal configuration which widens radially outwardly of said hub and which is open toward the inside of said hub; a radial bore extending radially from said groove outwardly of said hub; a threaded bore in said control ring arranged to be angularly aligned with said radial bore in said slip-on hub when said pockets in said control ring are angularly unaligned with said blocking members; a clamping wedge having a trapezoidal configuration generally conforming with the configuration of said axially extending groove, said wedge being engaged within said groove; and a pressure screw threadedly engaged within said threaded bore and operative to place said control ring in locked position by engagement against said clamping wedge when said threaded bore is angularly aligned with said radial bore in said hub.

Thus, in accordance with the invention, certain important objectives are achieved due to the specific structure and cooperative effects of the invention.

In the area of the hub wedge of the slip-on hub, laterally displaced from its axial center line, provision is made for an axially extending groove which expands trapezoidally toward the outside and is open toward the inside of the slip-on hub.

The radial bore which starts and extends from the groove and is open toward the outside is provided on the same axis as the groove of the slip-on hub. The control ring is provided with a threaded bore which, when the control ring is in a locked position, corresponds to the bore in the slip-on hub and receives the pressure screw. The trapezoidal clamping wedge is held with play in the groove and the peripheral spring loading the control ring in the locked position is held with one of its articulated ends in the clamping wedge and with its other articulated end in the control ring. The locked and unlocked positions of the mechanism are defined by stops.

The design of the shaft connection mechanism in accordance with the invention provides an advantage in that the locked and unlocked positions are clearly defined by the stop effect of the spring. A particular advantage arises due to the axially short size of the shaft connection making it possible to arrange the mechanism within the slip-on hub area receiving the power takeoff shaft.

Avoiding rotational play by tensioning the hub on the power takeoff shaft by means of the clamping wedge produces a protective effect on the drive line and the agricultural implement driven from the power takeoff shaft, because the rotational movement is highly irregular, especially if the universal joints which are utilized have different angles.

In an advantageous embodiment of the invention, provision is made so that in the locked position the articulated ends of the spring support each other in the peripheral direction and an annular groove provided in the control ring for receiving the spring and starting from the cylindrical inner wall of the control ring is recessed deeply enough for the peripheral spring, in the unlocked position, to be supported externally on the groove wall.

With this embodiment, the spring provides a double function; it acts as a spring and provides the stops in the locked and unlocked positions. Any additional measures to define the two positions, which would increase the size of the connection and the cost thereof, are not required.

In accordance with a further feature of the invention, the clamping wedge is adjustable by means of a deflecting element loaded by the axially movable pressure screw outside its center.

In this advantageous embodiment, the shaft connection may be integrated into a safety clutch designed as a friction clutch, for example.

In a further embodiment of the invention, the clamping wedge is offset toward the end of the associated hub wedge facing away from the main direction of rotation. This measure ensures that the carrying function of the multi-wedge connection is fully maintained.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
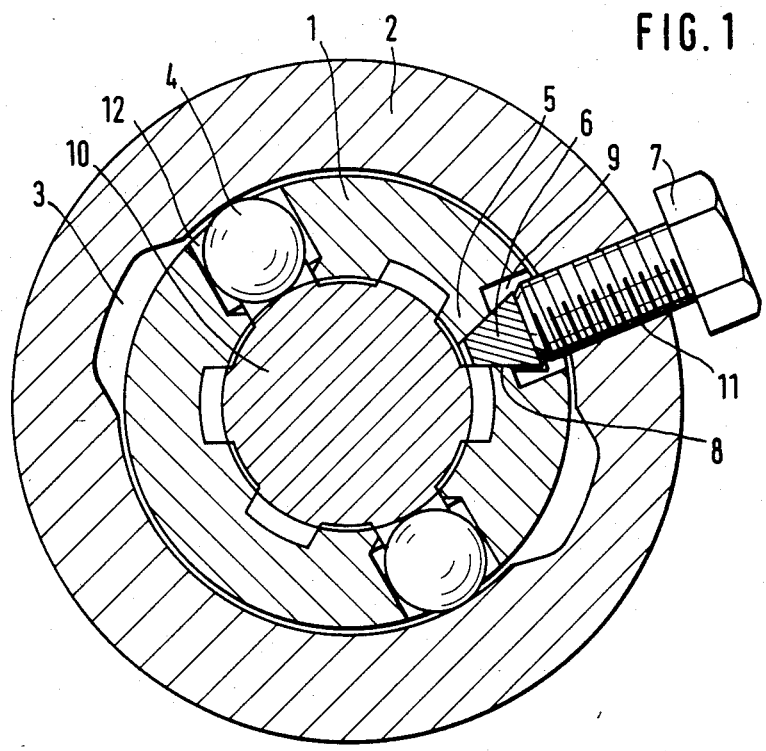
FIG. 1 is a cross-sectional view of a shaft connection mechanism in accordance with the present invention shown in the locked position, the view being taken along the line C-D of FIG. 3.
Figure 2:
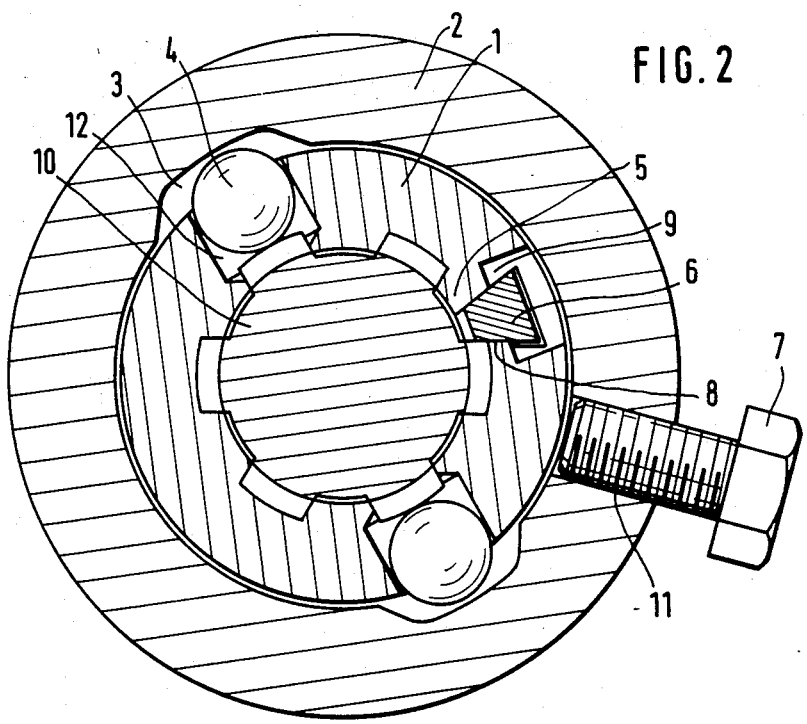
FIG. 2 is a cross-sectional view of the shaft connection shown in FIG. 1 shown in the unlocked position.
Figure 3:
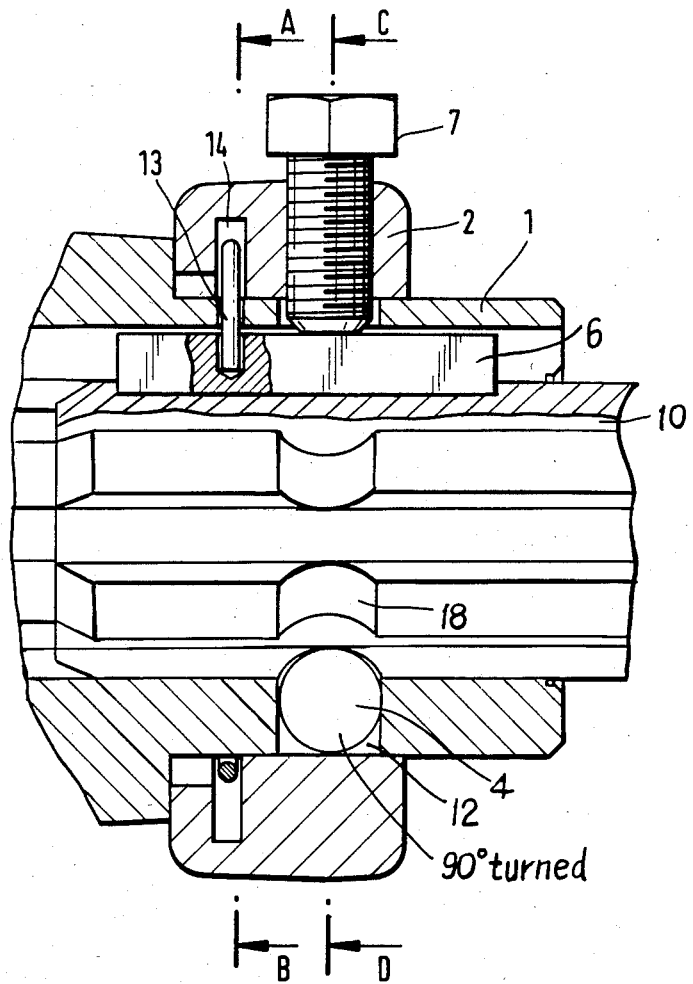
FIG. 3 is a longitudinal sectional view of the shaft connection mechanism of the invention.

Referring now to the drawings, and particularly to FIGS. 1-3, a first embodiment of the invention is shown therein as a shaft connection mechanism providing a connecting device in position on a splined power takeoff shaft 10 of an agricultural tractor or other implement. The assembly shown in FIGS. 1-3 includes blocking members 4 which engage into an annular groove 18 in the power takeoff shaft 10 and which are secured against radial movement outwardly of the assembly by a control ring 2.

The assembly includes a splined slip-on hub 1 which is in splined engagement with the power takeoff shaft 10 and which has a hub wedge 5 and at the end of the hub wedge 5 of the slip-on hub 1 facing away from the main direction of rotation, provision is made for an axially extending trapezoidal groove 8 within which a clamping wedge 6 is held, the wedge 6 having a trapezoidal configuration corresponding to the configuration of the groove 8.

A radial bore 9 is provided in the slip-on hub 1 arranged to extend in axial alignment with the trapezoidal groove 8 and essentially provided on the same axis on which the trapezoidal groove 8 has been arranged.

The control ring 2 is provided with a threaded bore 11 within which there is received a pressure screw 7. The clamping wedge 6 is tensioned inside the trapezoidal groove 8 by means of the pressure screw 7 in order to eliminate any rotational play of the slip-on hub 1 on the power takeoff shaft 10. Such circumferential play is eliminated in the power takeoff shaft joint in that the clamping wedge 6 is in abutting engagement between the hub 1 and a spline of the power takeoff shaft. Thus, the hub 1 and the power takeoff shaft 20 are circumferentially clamped against each other in one direction by interengagement of their respective splines, and by the wedge 6 in the opposite direction.

The control ring 2 is provided with pockets 3 which are angularly positioned relative to the threaded bore 11 in such a way that the pockets 3 in the locked position, i.e., in the position in which the threaded bore is located centrally above the clamping wedge 6, are offset relative to the receiving bores 12 for the blocking members 4. At the same time, the radial bore 9 acts as a safeguard against rotation if, for example, by mistake, the pressure screw 7 should not be sufficiently tightened. Under such circumstances, the control ring cannot be turned in such a way that the pockets 3 will be capable of moving towards the receiving bores 12.

Thus, with the device shown in the position of FIG. 1, and with the pressure screw 7 in clamped engagement against the clamping wedge 6, the pockets 3 in the control ring 2 will be angularly unaligned with the receiving bores 12 and with the blocking members 4 contained therein.

FIG. 2 shows the shaft connection mechanism in the unlocked position, i.e., with the pressure screw 7 turned back in such a way that the control ring 2 may be rotated until the pockets 3 move into the area of the receiving bores 12 and become angularly aligned with the blocking members 4 so that the members 4 may escape from the annular groove of the power takeoff shaft 10 into the pockets 3, the members 4 being urged outwardly as a result of abutment against the edges of the annular groove in the power takeoff shaft.

As indicated in FIG. 2, the pressure screw 7 is then in a loosened or radially outermost position out of engagement with the clamping wedge 6 and radially beyond the outer circumferential surface of the slip-on hub 1. Thus, relative rotation between the control ring 2 and the slip-on hub 1 is enabled.

FIG. 3 shows a longitudinal section of a shaft connection mechanism wherein a peripheral spring 13 is held in a peripherally extending groove 14 provided in the control ring 2. The peripheral spring 13 includes one articulated end which engages through the slip-on hub 1 into the clamping wedge 6 thereby securing the wedge 6 against axial displacement.

Figure 4:
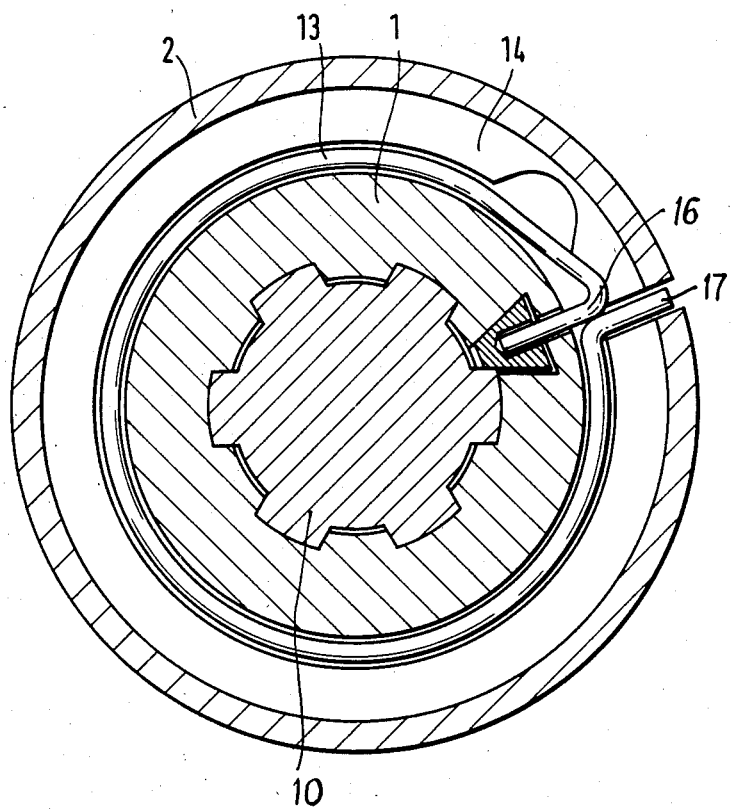
FIG. 4 is a cross-sectional view taken along the line A-B of FIG. 3.

In FIG. 4, there is shown a cross-sectional view of the shaft connection mechanism taken along the plane of the spring holding device. The spring held in the annular groove 14 in the locked position is supported by its two adjoining articulated ends 16, 17 which, in this case, act as stops relative to each other. As seen in FIG. 4, the end 16 is engaged with the slip-on hub 1 and the end 17 with the control ring 2. In its unlocked position, the spring is supported on the inner wall of the groove 14 in the control ring 2 which groove is of sufficient depth for the spring 13 in the unlocked position to be supported externally on the groove wall, in such a manner that further rotation of the control ring 2 is prevented. The action of the spring 13 occurs with the ends 16, 17 lying in the same radial plane, and, thus, they push against each other in one rotational direction of the spring. In the opposite rotational direction, the spring unwinds to an extent at which further rotational movement in this opposite direction is arrested.

Figure 5:
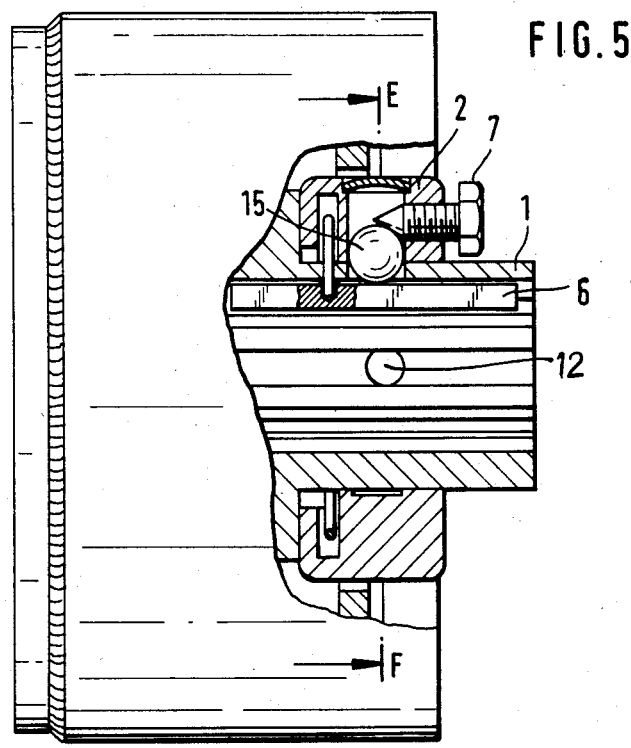
FIG. 5 is a longitudinal sectional view showing another embodiment of a shaft connection mechanism in accordance with the invention integrated into a friction clutch.

FIG. 5 shows another embodiment of a shaft connection mechanism in accordance with the present invention which is integrated into a friction clutch. As compared with the embodiment previously described, the force of the pressure screw 7 is transmitted to the clamping wedge 6 by means of a deflecting element 15, and as will be apparent from the drawing, the force of the screw 7 is converted from an axial direction to a radial direction as a result of abutment of the conical end of the screw 7 against the spherical element 15.

Figure 6:
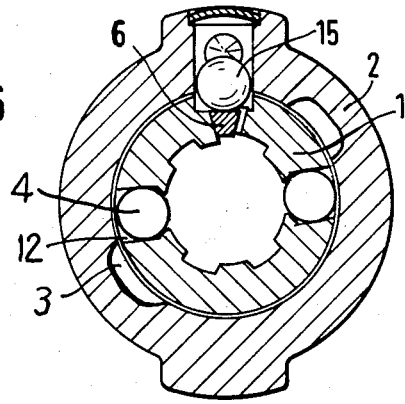
FIG. 6 is a cross-sectional view of the mechanism shown in FIG. 5.

FIG. 6 shows a cross-sectional view of the shaft connection mechanism illustrated in FIG. 5.

Accordingly, it will be seen that the shaft connection mechanism of the invention provides a shaft connecting device which serves to couple, in a clearance free manner, the power takeoff shaft of a tractor or implement with the drive shaft or clutch integrated into a drive shaft. The purpose is to ensure a positive axial connection to the power take-off shaft.

The objective of the invention is achieved in that in the area of the hub wedge of the slip-on hub 1, an axially extending groove 8 is provided which expands trapezoidally radially outwardly of the slip-on hub 1 and which is open toward the inside of the slip-on hub 1, the groove being arranged so as to be laterally offset relative to the axial center line of the hub wedge. On the axis of the groove in the slip-on hub, provision is made for a bore 9 which extends from the groove and which opens toward the outside radially of the control ring 2 having been provided with a threaded bore 11 which, in the locked position of the control ring, corresponds angularly to the bore in the slip-on hub and receives the pressure screw 7. In the groove 8, there is held with clearance the clamping wedge 6 which is also trapezoidal. The peripheral spring loading the control ring in the locked position is held with its one articulated end in the clamping wedge and with its other articulated end in the control ring so that the locked and unlocked positions are defined by stops.

While specific embodiments of the invention have been shown and described in detail to illustrate the application of the inventive principles, it will be understood that the invention may be embodied otherwise without departing from such principles.

What is claimed is:

1. A shaft connection mechanism particularly for securing a slip-on hub to the power takeoff shaft of a tractor comprising:
spline means interposed between said slip-on hub and said power takeoff shaft;
radial apertures formed in said slip-on hub;
blocking members guided radially in said radial apertures;
groove means in said power takeoff shaft adapted to have said blocking members engage therein;
a control ring supported on said slip-on hub, said control ring having pockets for receiving therein said blocking members;
a peripheral spring interposed between said slip-on hub and said control ring, said control ring being supported on said slip-on hub against the force of said peripheral spring so as to be rotatable relative thereto to a limited extent;
an axially extending groove formed in said slip-on hub, said groove having a trapezoidal configuration which widens radially outwardly of said hub and which is open toward the inside of said hub;
a radial bore extending radially from said groove outwardly of said hub;
a threaded bore in said control ring arranged to be angularly aligned with said radial bore in said slip-on hub when said pockets in said control ring are angularly unaligned with said blocking members;
a clamping wedge having a trapezoidal configuration generally conforming to the configuration of said axially extending groove, said wedge being engaged within said groove; and
a pressure screw threadedly engaged within said threaded bore and operative to place said control ring in locked position by engagement against said clamping wedge when said threaded bore is angularly aligned with said radial bore in said hub.

2. A mechanism according to claim 1, wherein said peripheral spring is formed with a pair of articulated ends comprising stops which define the locked and unlocked positions of said control ring.

3. A mechanism according to claim 1, wherein in the locked position, said articulated ends of said spring support each other in the peripheral direction and wherein an annular groove is provided in the control ring for receiving the spring, and starting from the cylindrical inner wall of the control ring is recessed to a sufficient depth for the peripheral spring in the unlocked position to be supported externally on the groove wall.

4. A mechanism according to claim 1, wherein said pressure screw is axially movable, said mechanism further comprising a deflecting element loaded by said axially movable pressure screw outside its center to adjust said clamping wedge.

5. A mechanism according to claim 1, wherein said slip-on hub includes a hub wedge arranged to define one side of said axially extending groove, said clamping wedge being offset towards the end of the associated hub wedge facing away from the main direction of rotation of said mechanism.

* * * * *